Figure 4:
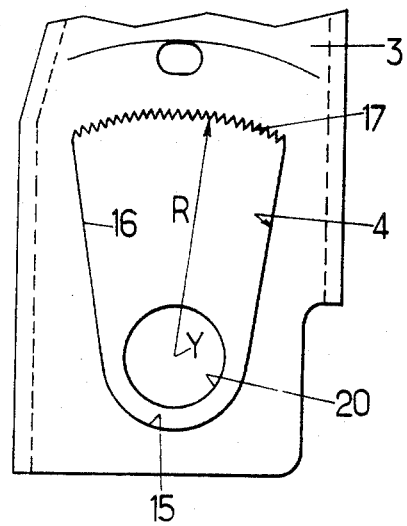

United States Patent [19]

Letournoux et al.

[11] Patent Number: 4,523,786
[45] Date of Patent: Jun. 18, 1985

[54] HINGE DEVICES FOR SEAT-BACKS

[75] Inventors: Alain Letournoux, St. Jean le Blanc; Bernard Courtois, Champigny Morigny, both of France

[73] Assignee: Societe Industrielle Bertrand Faure, Etampes, France

[21] Appl. No.: 511,627

[22] Filed: Jul. 7, 1983

[30] Foreign Application Priority Data

Jul. 22, 1982 [FR] France ................ 82 12812

[51] Int. Cl.³ .......................... A47C 1/026
[52] U.S. Cl. ..................... 297/367; 297/378
[58] Field of Search ............... 297/366–369, 297/378, 379

[56] References Cited

U.S. PATENT DOCUMENTS 4,169,626 10/1979 Hollar, Jr. ................ 297/378 X

FOREIGN PATENT DOCUMENTS 2364755 8/1974 Fed. Rep. of Germany ...... 297/367

Primary Examiner—Kenneth Downey
Attorney, Agent, or Firm—Cushman, Darby & Cushman

[57] ABSTRACT

The invention provides a seat-back hinge for a vehicle seat comprising an inwardly toothed sector integral with the sitting portion flange (1), an inwardly toothed sector integral with the seat-back flange (3), a toothed bolt (5) adapted to coact directly with these two sectors and a rotary cam (6) connected to a control hand-lever (22) and adapted to coact with the bolt. This bolt and this cam are mounted transversely floating and the cam comprises a semi-cylindrical land (11) adapted to coact directly with two complementary lands comprised by the two flanges.

6 Claims, 4 Drawing Figures

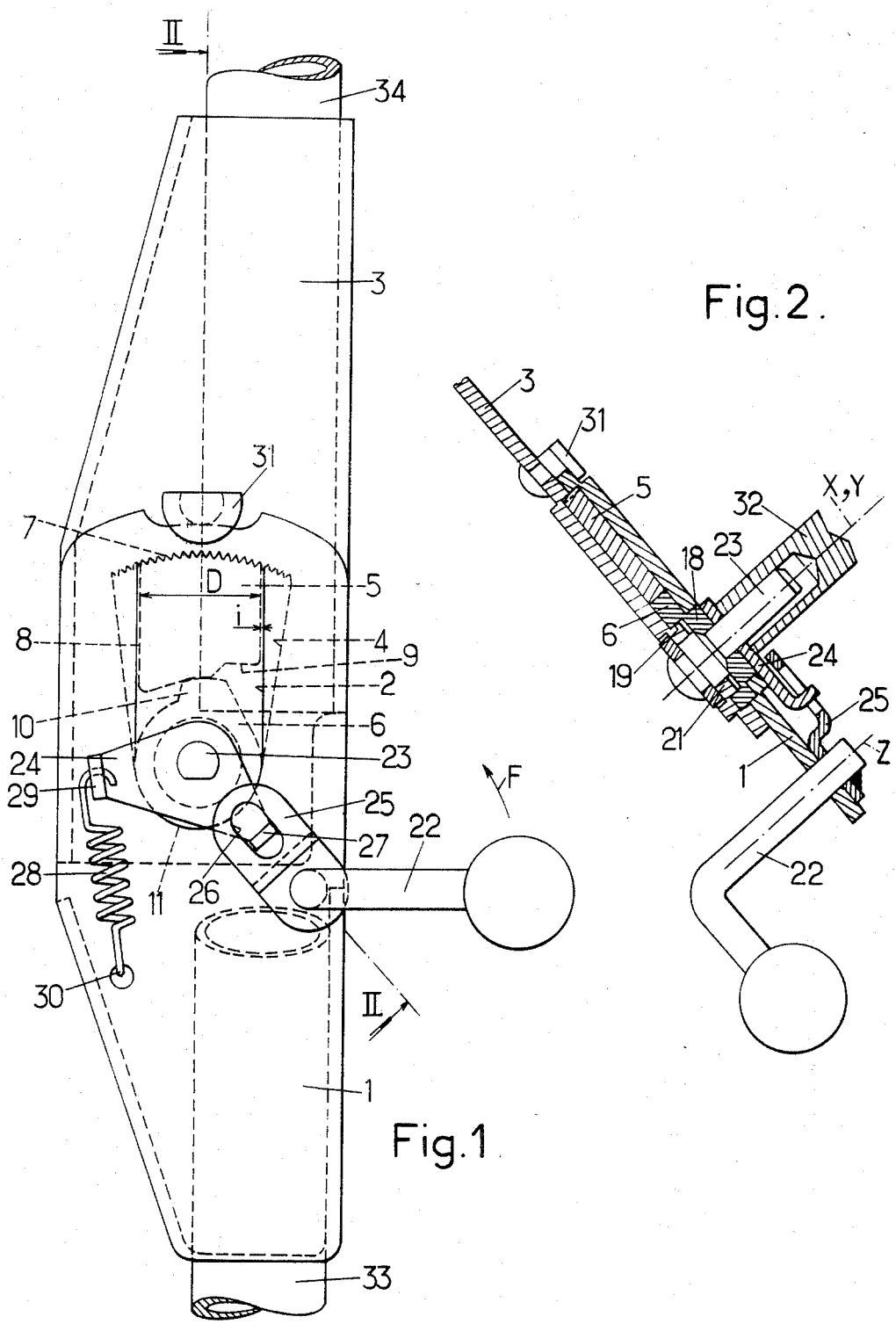

HINGE DEVICES FOR SEAT-BACKS

The invention relates to hinge devices for seat-backs, more especially for motor vehicles, for adjusting the slope of these backs and locking them in their different adjusted positions.

It relates more particularly, among these hinge devices, to those which comprise a control hand-lever accessible to the person sitting in the seat, a first inwardly toothed sector integral with a flange of the sitting portion, a second inwardly toothed sector integral with a flange of the seat-back and coaxial with the first sector, locking means operable by means of the control hand-lever for interlocking the two sectors at will angularly with respect to each other or freeing them angularly with respect to each other, means comprising a group of toothed bolts each adapted to coact with the teeth of the two sectors and a central flat rotary cam operable by means of the control hand-lever and adapted to coact with each bolt so as to move it radially away from the axis so as to engage it with the two sectors (locking position) or on the contrary to allow it to draw near to said axis which frees it from these two sectors (unlocking position), and means for resiliently urging the control hand-lever and so the cam to their positions corresponding to locking of the device.

It relates more particularly still, among the hinge devices considered, to those for which each bolt and the cam are mounted so as to be able to float slightly with respect to the flanges in the transverse direction, during unlocking, while being axially wedged between these two flanges.

The slightly floating mounting of each bolt ensures easy centripetal disengagement of this bolt from the teeth of the flanges during unlocking, as well as easy engagement of this bolt in these sets of teeth during locking: such mounting is preferably obtained by housing each bolt with slight lateral free motion in a radial guide formed in one of the flanges.

The slightly floating mounting of the cam guarantees full engagement of the teeth of the bolt in the opposite sets of teeth of the flanges, even if the tolerances relative to the sizes and mutual centering of the different parts of the mechanism (cam, bolts, sectors) are relatively wide.

To provide such floating mounting of the cam, which mounting is sufficient for ensuring correct mutual centering of the two flanges during unlocking, one of the two faces of this cam advantageously comprises a projection, cylindrical in revolution, adapted to coact with slight play with a complementary bore in one of the two flanges and the other face of the cam comprises a bore, cylindrical in revolution, adapted to coact with a slight play with a complementary projection on the other flange.

The hinges of this kind offer the important advantage of automatically removing all the undesirable free motion in the locked state.

Such a hinge has been described in U.S. Pat. No. 4,348,050 of the Applicant.

In this hinge device, each toothed sector extends over a complete ring and the group of bolts is formed of n separate bolts, n being a whole number at least equal to 2 and preferably equal to 3.

The floating cam is then locked, during locking of the hinge, by jamming same between the n bolts which surround it and which are pushed back radially thereby against as many toothed portions of each of the two rings.

The aim of the present invention is essentially to make the hinge devices of the kind in question less cumbersome, lighter and simpler, the number of component parts thereof being reduced.

To this end, these hinges are essentially characterized in that each of the two toothed sectors presents a total angular amplitude less than 90°, in that the group of bolts is formed by a single bolt and in that the flat cam presents on its periphery, opposite its single boss adapted to coact with the bolt, a semi-cylindrical land adapted to coact directly with two complementary semi-cylindrical lands comprised respectively by the two flanges and coaxial to the toothed sectors of these flanges.

In preferred embodiments, recourse is further had to one and/or other of the following arrangements:

in a hinge device of the kind indicated in which the bolt and the cam are jointingly housed in the direction of the axis of the hinge between the flat bottoms of two dishes formed respectively in the two flanges, the toothed sector and the semi-cylindrical land of each flange form respectively two opposite edges of the dish of this flange;

the semi-cylindrical land of the cam extends over a little more than 180° and those of the two flanges extend respectively over 180° and over a little less than 180°, in a hinge device according to the two preceding paragraphs, the remaining edges of the dish which comprises the exactly semi-cylindrical land are formed by two flat parallel sides adapted to guide the bolt radially with a slight play, in a hinge device according to the preceding paragraph, the remaining edges of the other dish are formed by two flat sides slightly diverging from the two ends of the corresponding substantially semi-cylindrical land, i.e. extending over a little less than 180°.

The invention comprises, apart from these main arrangements, certain other arrangements which are used preferably at the same time and which will be more explicitly discussed hereafter.

In what follows, a preferred embodiment of the invention will be described with reference to the accompanying drawings in a way which is of course in no wise limiting.

Figure 3:
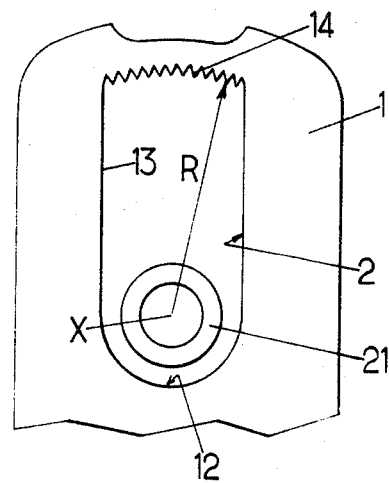

FIGS. 1 and 2 of these drawings show respectively in a side view and in an axial view bent along II—II of FIG. 1, a seat-back hinge formed in accordance with the invention;

FIGS. 3 and 4 show in a partial side view respectively two component elements of this hinge.

The hinge in question comprises:

a vertical flange 1 intended to be fixed to the framework of the sitting portion of the seat, in which flange there has been stamped with partial cutting out (which process will be designated by the expression "semi cut-out" hereinafter) a dish 2 with flat bottom, a vertical flange 3 intended to be fixed to the framework of the seat-back, in which flange another dish 4 with flat bottom has been semi cut-out.

These two flanges 1 and 3 are juxtaposed horizontally so that their two dishes 2 and 4—the periphery of which will be discussed further on—are facing each other and together form a flat case.

Inside this flat case are disposed a bolt 5 and a rotary cam 6.

These two parts 5 and 6 are both formed by plates whose thickness is equal to the inner axial dimension of the case so that they may slide jointingly along the opposing faces of the bottoms of the dishes defining axially this case.

The contour of bolt 5 comprises:

a toothed sector 7 of radius R, formed advantageously by a succession of small triangular teeth, two parallel rectilinear segments 8 spaced apart from one another by a distance D and connected respectively to the two ends of the toothed sector 7, and an oblique and broken line section 9 forming a heel and completing this contour opposite sector 7.

The contour of cam 6 comprises:

a boss 10 adapted to cooperate with heel 9, and a cylindrical bearing surface 11 of diameter D opposite this boss and extending over an arc greater than 180°.

The contour of one of the two dishes 3 (FIG. 3) comprises:

a half circle 12 with axis X and diameter D+i, i designating a clearance generally between 0.05 and 0.5 mm, preferably of the order of 0.1 to 0.2 mm, two parallel rectilinear segments 13 of the same length spaced apart from each other by a distance equal to D+i and connected tangentially to the two ends of the half circle 12, and a toothed sector 14 of radius R very much greater than D+i and for example equal to substantially twice this dimension, this sector being centered on axis X and presenting a profile adapted to coact with the toothed sector 7 of the bolt.

The contour of the other dish 4 comprises (FIG. 4):

an arc of a circle 15 of a diameter equal to D+i, centered on an axis Y and extending over a little less than 180°, two rectilinear segments 16 of the same length connected tangentially to the two ends of arc 15 and diverging slightly therefrom, and a toothed sector 17 of radius R completing this contour, centered on axis Y and presenting a profile adapted to coact with the toothed sector 7 of the bolt.

The angular extent of the toothed sector 17 is a little greater than that of the toothed sector 14 while remaining relatively small, i.e. less than 90°.

In the embodiment illustrated, these respective angular extents of sectors 17 and 14 are of the order of 55° and 35°.

When the two axes X and Y are placed in coincidence and when the hinge is unlocked the angular free motion of the seat back, that is to say the relative angular movement between dishes 2 and 4 is equal to the angle formed by the two rectilinear sides 16 of dish 4.

This angle is here less than 30°: in the case of the drawing, it is equal to 18°, which is largely sufficient in practice, as experience has shown.

In the mounted hinge device, the two axes X and Y are placed in coincidence except for the free motion and the rotary cam 6 then occupies a position in which its axis practically merges with these axes X and Y except for the free motion.

The mutual centering of the different concentric elements, which centering must be maintained with only small free motion during unlocking so as to maintain coherence of the hinge, is provided as follows:

cam plate 6 comprises a projection cylindrical in revolution 18 (FIG. 2) extending from one of its faces, and a bore cylindrical in revolution 19 formed in its other face as well as a semi-cylindrical land 11 as shown in FIG. 1, projection 18 is introduced with slight play j in a bore 20 (FIG. 4) formed in the bottom of dish 4 coaxially to the semi-cylindrical bearing surface 15, and bore 19 surrounds with a slight play k a cylindrical projection 21 extending axially towards the cam on the bottom of dish 2, coaxially to the semi-cylindrical bearing surface 12 (FIGS. 2 and 3).

Projection 18 and bore 19 of cam 6 are preferably obtained by the same semi cutting-out operation, so that they correspond mutually with, preferably, a diameter slightly less for the projection.

It is also by semi cutting-out that projection 21 is preferably formed in the bottom of dish 2.

The control of the rotations of the cam is provided from the rotations of a control hand-lever 22 mounted on flange 1 for pivoting about an axis Z parallel to axis X, by means of:

a pin 23 coaxial with said cam, having a cylindrical profile not of revolution and riveted in a complementary hole of the cam, a rocking lever 24 itself firmly secured angularly on pin 23, and a plate 25 bent into a Z and welded to handlever 22, said plate having a buttonhole 26 formed therein which jointingly surrounds a lug 27 bent back at one end of rocking lever 24.

A helical tension spring 28 fastened to end 29, of the rocking lever, opposite lug 27, and anchored at a point 30 on flange 1 constantly urges the mobile assembly formed by parts 22 to 27 in the direction in which cam 6 urges bolt 5 into its locking position in which it is in engagement at the same time with the two toothed sectors 14 and 17.

In this locking position, with each tooth of the set of teeth 7 of bolt 5 extending axially over the whole thickness of this bolt, it is respectively the two axial halves of such teeth which cooperate with the two sets of teeth 14 and 17 on flanges 1 and 3, respectively.

In the drawings there can be further seen:

a shouldered stud 31 riveted to flange 3 and overlapping one edge of flange 1 so as to maintain these two flanges axially juxtaposed, a transverse bar 32 connected angularly to rocking lever 24 and adapted to transmit the angular movements of cam 6 to a second similar cam forming part of a mechanism similar to the one described above and disposed on the other side of the seat considered, tubes 33,34 forming respectively the framework of the sitting portion and that of the seat-back and welded respectively to flanges 1 and 2.

The operation of the hinge described above is as follows.

In the locked rest position, the tension of spring 28 causes the boss 10 of cam 6 to be applied against the heel of bolt 5, which engages this latter with the two sets of teeth 14 and 17.

Flange 3 of the seat-back is then locked angularly, the angular forces exerted thereon about axis X,Y being directly transmitted from its set of teeth 17 to the set of teeth 14 by bolt 5 itself.

It should then be noted that the play i existing between bolt 5 and its guide 2 cannot be the source of any loose movement at the time more especially of reversal of the direction of the angular forces exerted on the seat-back, since the method described for transmitting these forces involves neither the sides of the bolt nor those of its guide.

Moreover, because of the slight plays j and k existing between cam 6 and each of flanges 1 and 3, which plays are greater than the inevitable eccentricities due to manufacture between the different concentric elements, the bearing provided between cam 6 and bolt 5 achieves the dual effect of automatically fully applying:

on the one hand, teeth 7 of the bolt into the two facing sets of teeth 14 and 17, and on the other hand, cam 6 against the two semi-cylindrical bearing surfaces 12 and 15.

All the free motions are thus automatically and completely eliminated in the locked position of the mechanism.

To unlock the hinge device, it is sufficient to move hand-lever 22 in the direction of arrow F, which moves boss 10 angularly away from the heel of bolt 5.

The least angular force then exerted on the seat-back about axis X,Y urges the bolt in the direction of this axis, which unlocks the hinge: this operation is facilitated by the freely floating mounting of the bolt which prevents any jamming thereof.

The slope of the seat-back of the seat may then be modified at will, the seat-back being generally applied against the back of the user by means of an appropriate spring, not shown.

When the desired adjusted position is attained, it is sufficient to release hand-lever 22 for the relaxation of spring 28 to again provide locking of the hinge: the transverse floating of the bolt allows the new engagement between this bolt and the sets of teeth 14 and 17 to be very smoothly begun, even when the mutual radial positioning does not correspond to an exactly centered presentation of a tooth of the bolt opposite each notch of the set of teeth.

Following which and whatever the embodiment adopted, a hinge device is finally obtained whose construction and operation follow sufficiently from what has gone before.

This hinge has a certain number of advantages with respect to those known heretofore, more especially in that the number of its component parts is particularly small and in that the space it requires and its weight are substantially reduced.

As is evident, and as it follows moreover already from what has gone before, the invention is in no wise limited to those of its modes of application and embodiments which have been more especially considered; it embraces, on the contrary, all variations thereof, more particularly:

those where the two toothed sectors which the two flanges respectively comprise have different radii, while remaining centered on the same axis, these two sectors then cooperating respectively with two complementary sectors comprised by the bolt and stepped with respect to each other, those where the two semi-cylindrical lands comprised respectively by the two flanges have different radii, while remaining centered on the same axis, these two semi-cylindrical lands then cooperating respectively with two complementary semi-cylindrical lands comprised by the cam and stepped with respect to each other, these latter two semi-cylindrical lands constituting together the so-called "semi-cylindrical land of the cam."

We claim:

1. A hinge device for a seat-back, comprising a control hand-lever (22) accessible to the person sitting in the seat, a first inwardly toothed sector (14) integral with a flange (1) of the sitting portion, a second inwardly toothed sector (17) integral with a flange (3) of the seat-back and coaxial with the first sector, locking means operable by means of the control hand-lever to make the two sectors at will either angularly locked with each other or angularly free with respect to each other, means comprising a group of toothed bolts adapted to coact with the teeth of the two sectors and a flat central rotary cam (6) operable by means of the control hand-lever and adapted to coact with each bolt so as to either move it radially away from the axis for engaging it with the two sectors (locking position), or on the contrary to allow it to be moved closer to said axis which frees it from these two sectors (unlocking position), and means (28) for resiliently urging the control hand-lever and so the cam to their positions corresponding to locking, each bolt and the cam being mounted so as to be able to float slightly transversely with respect to the flanges while being axially wedged between these flanges, characterized in that each of the two toothed sectors (14,17) presents a total angular amplitude less than 90°, in that the group of bolts is formed by a single bolt (5) and in that the flat cam (6) has on its periphery, opposite its single boss (10) adapted to coact with the bolt, a semi-cylindrical land (11) adapted to coact directly with two complementary semi-cylindrical lands (12,15) comprised respectively by the two flanges, these lands being coaxial to the toothed sectors of these flanges.

2. The hinge device according to claim 1, for which the bolt (5) and the cam (6) are housed jointingly in the direction of the axis of the hinge between the flat bottoms of two dishes (2,4) formed respectively in the two flanges (1,3), characterized in that the toothed sector (14,17) and the semi-cylindrical land (12,15) of each flange form respectively two opposite edges of the dish of this flange.

3. The hinge device according to claim 1, characterized in that the semi-cylindrical land of the cam extends over a little more than 180° and in that the semi-cylindrical lands of the two dishes extend respectively over 180° and over a little less than 180°.

4. The hinge device according to claim 3, characterized in that the remaining edges of the dish (2) which corresponds to the exactly semi-cylindrical land (12) are formed by two parallel flat sides (13) adapted to radially guide the bolt with a small free motion (i).

5. The hinge device according to claim 4, characterized in that the remaining edges of the other dish (4) are formed by two flat sides (16) slightly divergent from the two ends of the corresponding substantially semi-cylindrical land (15), i.e. extending over a little less than 180°.

6. A device for locking a seat hinge having back and seat flanges pivotally joined together so that each flange has an overlapping portion, said back flange having means defining a first radially outwardly extending pocket in its overlapping portion and having at least one exposed edge portion, said seat flange having means defining a second radially outwardly extending pocket in its overlapping portion and having at least one exposed edge portion, said back and seat flanges being respectively positioned so that said first and second radially outwardly extending pockets overlap one another and form a chamber therebetween and each of said at least one exposed edge portions pivot relative to one another through a common one, and locking means positioned between said back and seat flanges within said chamber and being selectively movable between a first, locking position engaging both of said at least one exposed edge portions and locking each together to prevent relative movement therebetween and a second, unlocking position wherein both of said at least one exposed exposed edge portions are disengaged and relatively movable.

* * * * *